(12) United States Patent
Kanvar et al.

(10) Patent No.: US 12,293,241 B2
(45) Date of Patent: May 6, 2025

(54) AUTOMATED GENERATION OF APPLICATION PROGRAMMING INTERFACES FOR MICROSERVICES

(71) Applicant: INTERNATIONAL BUSINESS MACHINES CORPORATION, Armonk, NY (US)

(72) Inventors: Vini Kanvar, New Delhi (IN); Ridhi Jain, Jhansi (IN); Srikanth Govindaraj Tamilselvam, Chennai (IN); Amith Singhee, Bangalore (IN); Shivali Agarwal, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 17/806,812

(22) Filed: Jun. 14, 2022

(65) Prior Publication Data
US 2023/0409417 A1  Dec. 21, 2023

(51) Int. Cl.
*G06F 9/54* (2006.01)

(52) U.S. Cl.
CPC .................. *G06F 9/547* (2013.01)

(58) Field of Classification Search
CPC ..... G06F 8/20; G06F 8/36; G06F 8/76; G06F 9/547; G06F 9/541
See application file for complete search history.

(56) References Cited

U.S. PATENT DOCUMENTS 10,430,250 B2 * 10/2019 Ishikawa ............ H04L 41/5041
10,579,370 B2    3/2020 Gupta
10,841,392 B2   11/2020 Walsh
10,936,291 B1 *  3/2021 Gamliel .................. G06F 8/72
2020/0401386 A1* 12/2020 Punathil ................ G06F 8/433
2021/0011688 A1*  1/2021 Sasidharan .............. G06F 8/10
2021/0029001 A1*  1/2021 Sen ........................ G06F 8/433

(Continued)

OTHER PUBLICATIONS

Koschel et al., "Making the Move to Microservice Architecture" (Jul. 17-19, 2017), 2017 International Conference on Information Society (i-Society), pp. 74-79, [retrieved from https://ieeexplore.ieee.org/abstract/document/8354675]. (Year: 2017).*

(Continued)

*Primary Examiner* — Brian W Wathen
(74) *Attorney, Agent, or Firm* — Eric W. Chesley

(57) ABSTRACT

Described are techniques for exposing an endpoint for a software function used by microservices. The techniques include obtaining software classes of a plurality of microservices and analyzing the software classes to identify a software function that is eligible for conversion to an application programming interface (API) format. The techniques further include determining a server microservice, which hosts a software class that includes the software function, and one or more client microservices that use the software function. The techniques further include generating deployable source code implementing an API that exposes the software function hosted by the server microservice to the one or more client microservices. The API uses a software wrapper to encapsulate software function semantics used by a monolith application refactored into the plurality of microservices.

17 Claims, 10 Drawing Sheets

(56) References Cited

U.S. PATENT DOCUMENTS

2021/0124577 A1* 4/2021 Gupta ............... G06F 9/45533

OTHER PUBLICATIONS

Zaragoza et al., "Refactoring Monolithic Object-Oriented Source Code to Materialize Microservice-oriented Architecture" (Jul. 2021), ICSOFT 2021—16th International Conference on Software Technologies, Jul. 2021, pp. 78-89 [retrieved from https://pdfs.semanticscholar.org/329a/78c656fa482 (Year: 2021).*

Banerjee., "Understanding the Advantages of Using IBM Mono2Micro to Automate Application Refactoring", IBM Developer, Aug. 27, 2020, 10 Pgs, <https://developer.ibm.com/articles/advantages-of-using-ibm-mono2micro . . . >.

Dehghani., "How to break a Monolith into Microservices", Apr. 24, 2018, 17 Pgs, <https://martinfowler.com/articles/break-monolith-into-microservices.html#MinimizeDependencyBackToTheMonolith>.

Google Cloud, "Refactoring a Monolith Into Microservices", Access on May 9, 2022, 15 Pgs, <https://cloud.google.com/architecture/microservices-architecture-refactoring-monoliths>.

Jin et al., "Functionality-Oriented Microservice Extraction Based on Execution Trace Clustering", ResearchGate, Conference 2018:IEEE International Conference on Web Services (ICWS),, Jul. 2018, DOI:10.1109/ICSW.2018.00034, 9 Pgs, <https://www.researchgate.net/publication/327479166>.

Mell et al., "The NIST Definition of Cloud Computing", National Institute of Standards and Technology, Special Publication 800-145, Sep. 2011, 7 pages.

Theivendra., "IBM Mono2Micro: AI-driven refactoring of monoliths to microservices for WebSphere Liberty", IBM, May 4, 2021, 8 Pgs, <https://community.ibm.com/community/user/wasdevops/blogs/leonard-theivendra1/2021/04/06/mono2micro-intro>.

* cited by examiner

500

502
Obtain software classes of a plurality of microservices, wherein each microservice comprises one or more software classes

504
Analyze the software classes of the plurality of microservices to identify a software function that is eligible for conversion to an application programming interface (API) format

506
Determine a server microservice, which hosts a software class that includes the software function, and one or more client microservices that use the software function

508
Generate deployable source code implementing an API that exposes the software function hosted by the server microservice to the one or more client microservices, wherein the API uses a software wrapper to encapsulate software function semantics that was used by a monolith application prior to refactoring of the monolith application into the plurality of microservices

AUTOMATED GENERATION OF APPLICATION PROGRAMMING INTERFACES FOR MICROSERVICES

BACKGROUND

The present application generally relates to information technology and, more particularly, to improving application refactorization.

A microservice architecture arranges an application as a collection of loosely coupled services. In a microservice architecture, an application can be decomposed into a number of microservices, where each microservice carries out a process of the application. Each microservice can be fine-grained, and protocols can be lightweight. The microservice architecture allows service developers to create microservices independent of other microservices within the microservice environment. Loose coupling of the microservices reduces the types of dependencies between microservices. The microservices can communicate with each other via application programming interfaces (APIs).

Organizations can refactor monolith application architectures into microservice architectures as part of hosting an application in a cloud environment. Generally, refactoring a monolith application architecture involves partitioning the software components into finer modules, such that execution and development of the modules can happen independently.

SUMMARY

Aspects of the present disclosure are directed toward a computer-implemented method comprising obtaining software classes of a plurality of microservices, where each microservice comprises one or more software classes. The method further comprises analyzing the software classes of the plurality of microservices to identify a software function that is eligible for conversion to an application programming interface (API) format. The method further comprises determining a server microservice, which hosts a software class that includes the software function, and one or more client microservices that use the software function. The method further comprises generating deployable source code implementing an API that exposes the software function hosted by the server microservice to the one or more client microservices. The API uses a software wrapper to encapsulate software function semantics used by a monolith application that has been refactored into the plurality of microservices.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 5 is a flow diagram illustrating an example method for generating APIs for software functions used by multiple microservices, in accordance with some embodiments of the present disclosure.

Figure 1A:
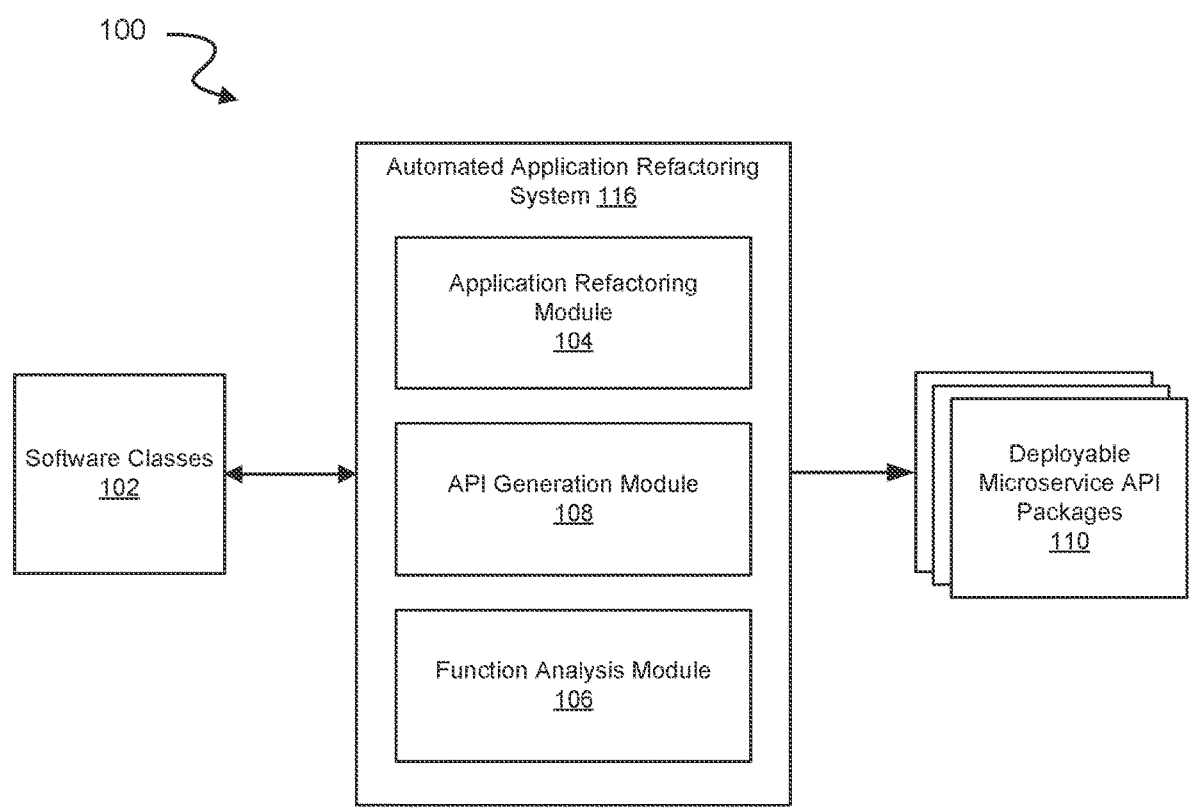
FIG. 1A is a block diagram illustrating an example computational environment implementing automated monolith application refactoring, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward exposing an endpoint for a software function used by microservices, and more specifically, automated generation of deployable source code implementing an API that exposes a software function hosted by a server microservice to one or more client microservices. As used herein, the term "software function" can also refer to a "software method", such that a "software method" is a "software function" linked to a data object.

Monolith architecture encapsulates an application into a single deployable unit. The monolith architecture offers benefits like onboarding developers quickly and makes deployment easier. However, maintaining a monolithic application becomes difficult as the monolithic application ages. Therefore, a microservices architecture may provide a better alternative to the monolith architecture because microservices can be used to build an application as a connection of simple services, each performing a domain function. Microservices are also well suited for cloud deployment due to the utilization and cost benefits associated with deploying and scaling services individually. As such, organizations are increasingly refactoring their legacy monolith applications into microservices as part of transitioning to a cloud computing environment.

However, many challenges exist in refactoring a monolith application into microservices. For example, refactoring a monolith application to candidate microservices may pose challenges for exposing endpoints for software functions while preserving semantics used by the monolith application, as well as how to handle object references considering that memory address space and resources are no longer shared, and adhering to Open API standards. In general, past techniques have failed to address these challenges and generate functionally independent and deployable microservices.

Advantageously, aspects of the present disclosure overcome these challenges by automating refactoring of a monolith application by detecting disconnected-subgraphs for possible code movements and a wrapper-based approach to generate functional API code for accessing shared software functions, which is deployable and preserves the semantics of the monolith application. More specifically, aspects of the present disclosure can analyze software classes of microservices and identify a software function that is eligible for conversion to an API format. Aspects of the present disclosure can then generate deployable source code implementing the API to expose the software function microservices that use the software function using a software wrapper to encapsulate semantics used by the monolith application. Also, aspects of the present disclosure replace an object passing technique used by a monolith application with an object identifier passing technique that allows an object to be maintained on a single microservice acting as a server for a software function.

To further describe the aspects of the present disclosure, examples are now provided with reference to the figures. FIG. 1A is a block diagram illustrating an example computational environment 100 implementing automated monolith application refactoring, in accordance with some embodiments of the present disclosure. The computational environment 100 includes an automated application refactoring system 116 comprising an application refactoring module 104, a function analysis module 106, an API generation module 108, and other modules for refactoring a monolith application. The automated application refactoring system 116 obtains a plurality of clusters of software classes 102 for a monolith application. In some example embodiments, the clusters of software classes 102 can be automatically generated by another system or service component of the automated application refactoring system 116. As an example, the clusters of software classes 102 may be generated using at least one of a static and/or dynamic analysis of a monolith application.

The application refactoring module 104 analyzes the cluster of software classes 102 of the monolith application and refactors the monolith application into a number of microservices. Refactoring is a technique for restructuring an existing body of code to alter the internal structure of an application (a program or piece of software) without changing the application's external behavior.

As part of the refactoring process, the application refactoring module 104 moves software functions accessed by only one other cluster of software class(es) to a respective cluster to reduce overall cross-cluster dependencies. In some embodiments, the application refactoring module 104 calls the function analysis module 106 to obtain information for software functions that can be disconnected from one software class and moved to another software class that is dependent on the software function. In response, the function analysis module 106 analyzes the clusters of software classes 102 to identify one or more software functions that receive cross-cluster calls and determines which of the cross-cluster dependencies can be resolved by moving a software function to a dependent cluster. In some embodiments, the function analysis module 106 can use a call-graph analysis technique to identify cross-cluster dependencies on one or more software functions. The function analysis module 106 returns information for movement-eligible software functions to the application refactoring module 104.

In response to receiving information for a movement-eligible software function, the application refactoring module 104 creates a disconnected subgraph of functional code (e.g., a program function and variables) configured to execute the software function. The application refactoring module 104 moves the subgraph to a cluster of software classes 102 that depends on the software function. As a non-limiting example, a subgraph for a software function contained in a cluster of software classes "Cluster 1" can be moved to another cluster of software classes "Cluster 2" when "Cluster 2" is the only cluster that calls the software function. As described below, APIs can be created for those software functions that are not moved because the software functions are accessed by two or more clusters of software classes 102. The clusters of software classes 102 that result from the restructuring performed by the application refactoring module 104 are independent microservices configured to perform a specific process of the monolithic application.

For software functions that are not moved because the software functions are accessed by two or more clusters of software classes 102, the application refactoring module 104 can create APIs for cross-microservice access of the software functions. In some embodiments, the application refactoring module 104 calls the function analysis module 106 to obtain information for API eligible software functions.

A number of different approaches can be used by the automated application refactoring system 116 to identify API eligible software functions for a microservice architecture. As one example, the function analysis module 106 analyzes the source code of a monolith application and automatically identifies non-conventional coding designs for a microservice architecture and provides an API recommendation to a user for remediation of a non-conventional coding design. As another example, business domain models and user recommendations can be obtained to determine microservice APIs (e.g., a business domain model for a monolith application can define subdomains and services that can be exposed an APIs). For example, a business domain model can be leveraged for an API signature using tool recommendations or user provided mapping of an implementation file to a domain object specifying different endpoints (e.g., API signature aligned to business model when a software function and business object are considered the same). Also, natural language processing (NLP) techniques can be used to map endpoints and dependencies (e.g., an activation method can be mapped to a business model specification). As another example, a user can provide the automated application refactoring system 116 (via a user interface) with suggestions for software functions in a monolith application to expose using an API. As yet another example, a monolith application can be broken down into a plurality of clusters of software classes and analyzed to identify API eligible software functions, as described in more detail below. Software functions in monolith applications having coding standards (e.g., original library objects, non-compatible static, etc.) that are not compatible with a microservice architecture are not identified as being API eligible.

Some coding design considerations used by the automated application refactoring system 116 for implementing a micro service architecture based on non-conventional coding styles found in monolith applications can include: not sharing non-primitive objects containing static member fields between microservices because these can be difficult to pass; avoiding state changes at the server because maintaining states becomes difficult; avoid maintaining references in an API based workflow; avoid identifying simple getter/setter functions as APIs because it increases interactions between microservices; and reference external resources, like files, sockets, tables, and queues, via some external configuration accessible to the microservices (e.g., file path or dataset name, IP and port for socket, database connection parameters and fully qualified table names, queue manager parameters and queue name, etc.).

As mentioned above, the monolith application can be broken down into a plurality of clusters of software classes 102. The function analysis module 106 can analyze the clusters of software classes 102 to identify one or more API eligible software functions and return the information for the software functions to the application refactoring module 104. Illustratively, a software function may be API eligible when the software function is called within a first cluster of software classes 102 (a first microservice) that hosts the microservice, and is also called by at least a second cluster of software classes 102 (a second microservice). In some embodiments, as part of determining that a software function is API eligible, the function analysis module 106 can determine which of the clusters of software classes 102 is a server microservice that hosts the software function, and which of the clusters of software classes 102 is a client microservice that calls the software function. The function analysis module 106 returns information for API-eligible software functions to the application refactoring module 104.

In response to receiving information for an API-eligible software function, the application refactoring module 104 sends the information to the API generation module 108, which generates deployable source code (e.g., deployable microservice API packages 110) implementing an API that exposes the software function to one or more client-microservices. A protocol used by the API can be an open API protocol, a representational state transfer (REST) API protocol, a simple object access protocol (SOAP), a remote procedure call (RPC) protocol, or the like. The API can use a software wrapper to encapsulate software function semantics that were used by the monolith application prior to refactoring of the monolith application into microservices, which is described in more detail later in association with FIG. 3.

In some embodiments, the automated application refactoring system 116 can convert a definition and call for an API to a REST API format using a translator (not shown). The translator can support the features of concurrent translation and incremental development. More specifically, the concurrent translation feature can comprise a multithreaded tool that converts each API of a monolith application into REST APIs in parallel. The incremental development feature can convert a new API introduced into a monolith application into a REST API format without modification to other parts of the monolith code.

As shown in FIG. 1A, in some examples, the API generation module 108 generates deployable microservice API packages 110, which can contain source code for an API, metadata for the API, and any dependencies necessary for the API to execute. More specifically, the API generation module 108 can generate deployable microservice API packages. A microservice API package acts as a server with respect to the APIs it exposes. A microservice API package acts as a client with respect to the APIs it calls. Therefore, a microservice can act both like a server and a client for different APIs.

The deployable microservice API packages 110 contain server-side API components that enable the server microservice to receive calls to execute a software function hosted on the server-microservice. In some embodiments, the API generation module 108 can create a server wrapper class to include in the deployable microservice API packages 110. The server wrapper class can include computer instructions that expose the software function to client microservices and encapsulate legacy source code used by the monolith application to execute the software function.

The deployable microservice API packages 110 contain client-side API components that enable the client microservice to call the software function hosted on the server microservice. In some embodiments, the API generation module 108 can create a client wrapper class to include in the deployable microservice API packages 110. The client wrapper class can include computer instructions for calling the software function using the API and include legacy source code used by the monolith application to call the software function. The deployable microservice API packages 110 created by the API generation module 108 enables communication between client-server microservices deployed in different cloud environments, cloud containers (e.g., packages of software that contain necessary components to execute in a computing environment), and/or virtual machines (e.g., virtual computer architecture that provides functionality of a physical computer).

In some examples, the server wrapper class and the client wrapper class included in the deployable microservice API packages 110 generated by the API generation module 108 can include source code that replaces an object passing technique used by a monolith application with an object identifier passing technique. Unlike a monolith application, address space and resources are not shared between microservices. To compensate for this, an object can be created on a server microservice, and a unique object identifier can be passed between a client microservice and the server microservice, as described in more detail later in association with FIG. 4. More specifically, the server wrapper class can include computer instructions that create an object and a unique object identifier in response to a request from a client microservice. The unique object identifier is provided to the client microservice, and the computer instructions included in the client wrapper class passes the unique object identifier to the server microservice along with requests to access the object.

Figure 1B:
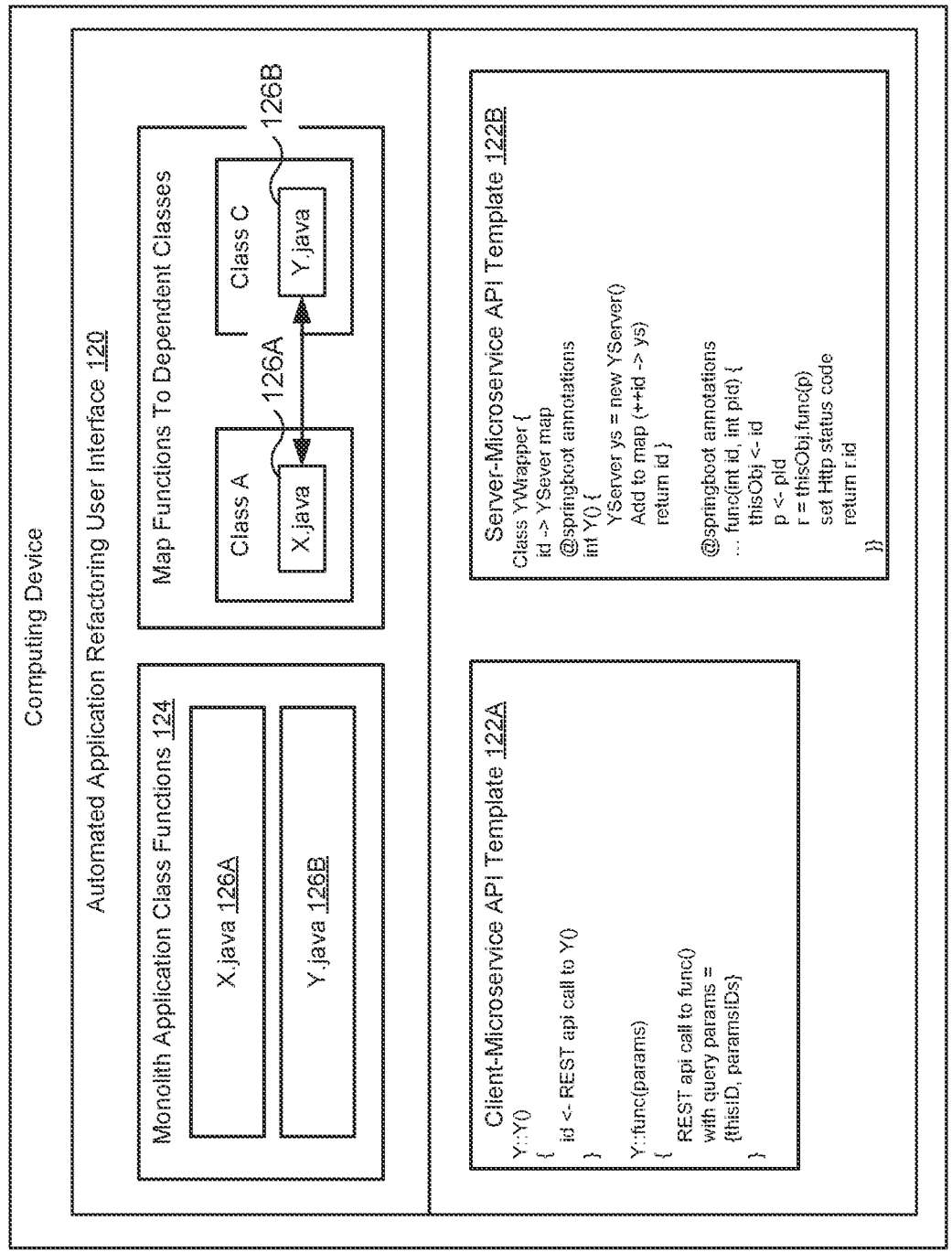
FIG. 1B is a diagram that illustrates an example user interface for an automated application refactoring system, in accordance with some embodiments of the present disclosure.

In some examples, the automated application refactoring system 116 can provide a user interface. FIG. 1B shows an example user interface 120 that allows a user (e.g., a subject matter expert) to select candidate software functions in the source code of a monolith application 124 to expose to other microservices using an API. The user can utilize the user interface 120 to map a candidate software function 126A-B to one or more dependent software classes 126A-B (e.g., via graphical tools provided by the user interface 120), and the API generation module 108 (shown in FIG. 1A) can use the mappings to generate deployable source code for an API that exposes the software function 126A-B to classes in other microservices. In some examples, the user interface 120 can provide a user with source code templates 122A-B for both an API definition and API call, and the user can insert the source code templates 122A-B into the modules of a server microservice and a client microservice, and make any needed modifications to the source code templates 122A-B that implements the API in the microservice architecture.

The modules illustrated and discussed in FIG. 1A can be implemented as computing services. In some embodiments, a module can be considered a service with one or more processes executing on a server or other computer hardware. Such services can provide a service application that receive requests and provide output to other services or consumer devices. An API may be provided for each module to enable a second module to send requests to and receive output from the first module. Such APIs can also allow third parties to interface with the module and make requests and receive output from the modules.

Figure 2A:
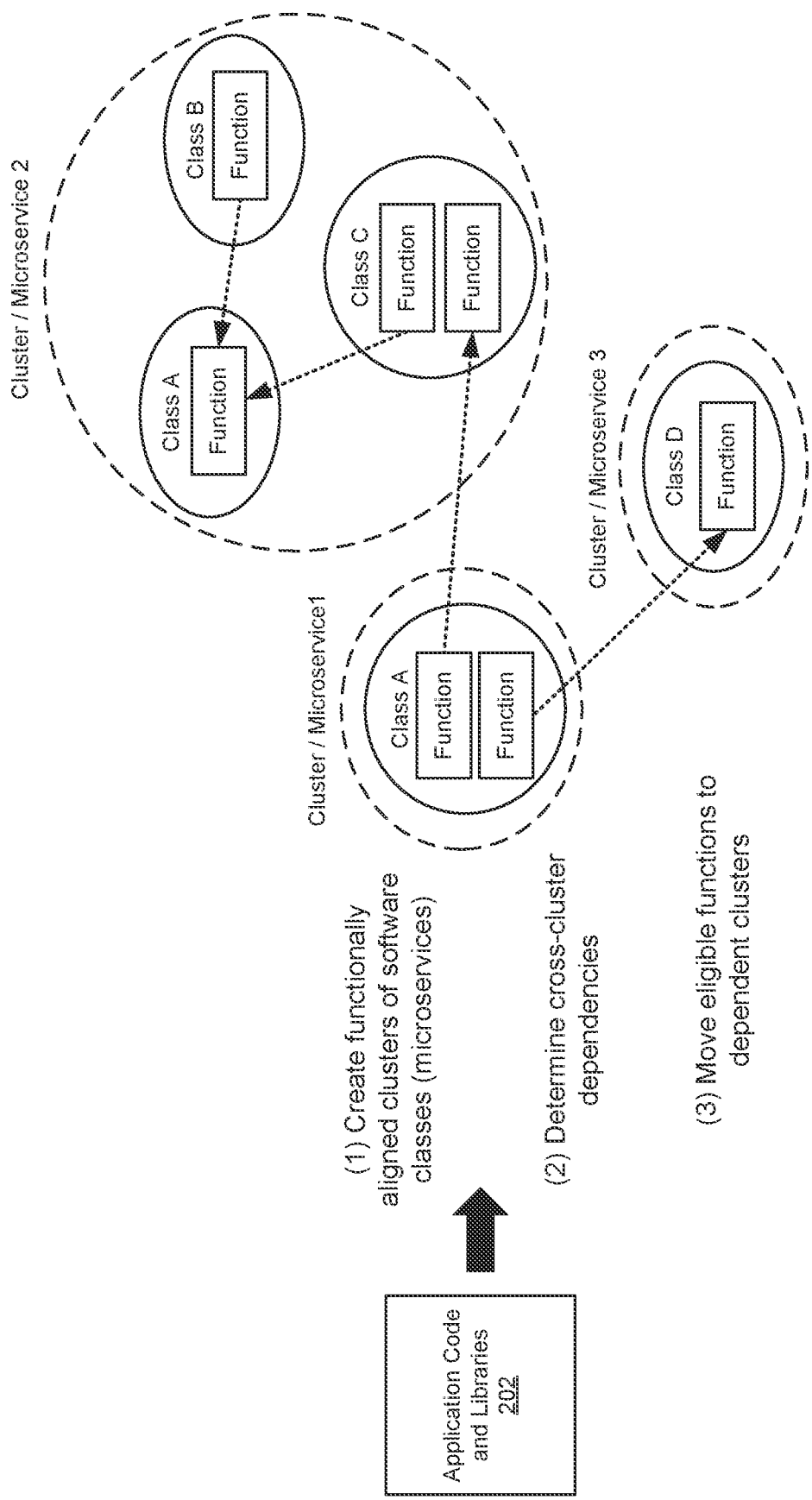
FIGS. 2A-B are diagrams illustrating an example method for automated monolith application refactoring, in accordance with some embodiments of the present disclosure.
Figure 2B:
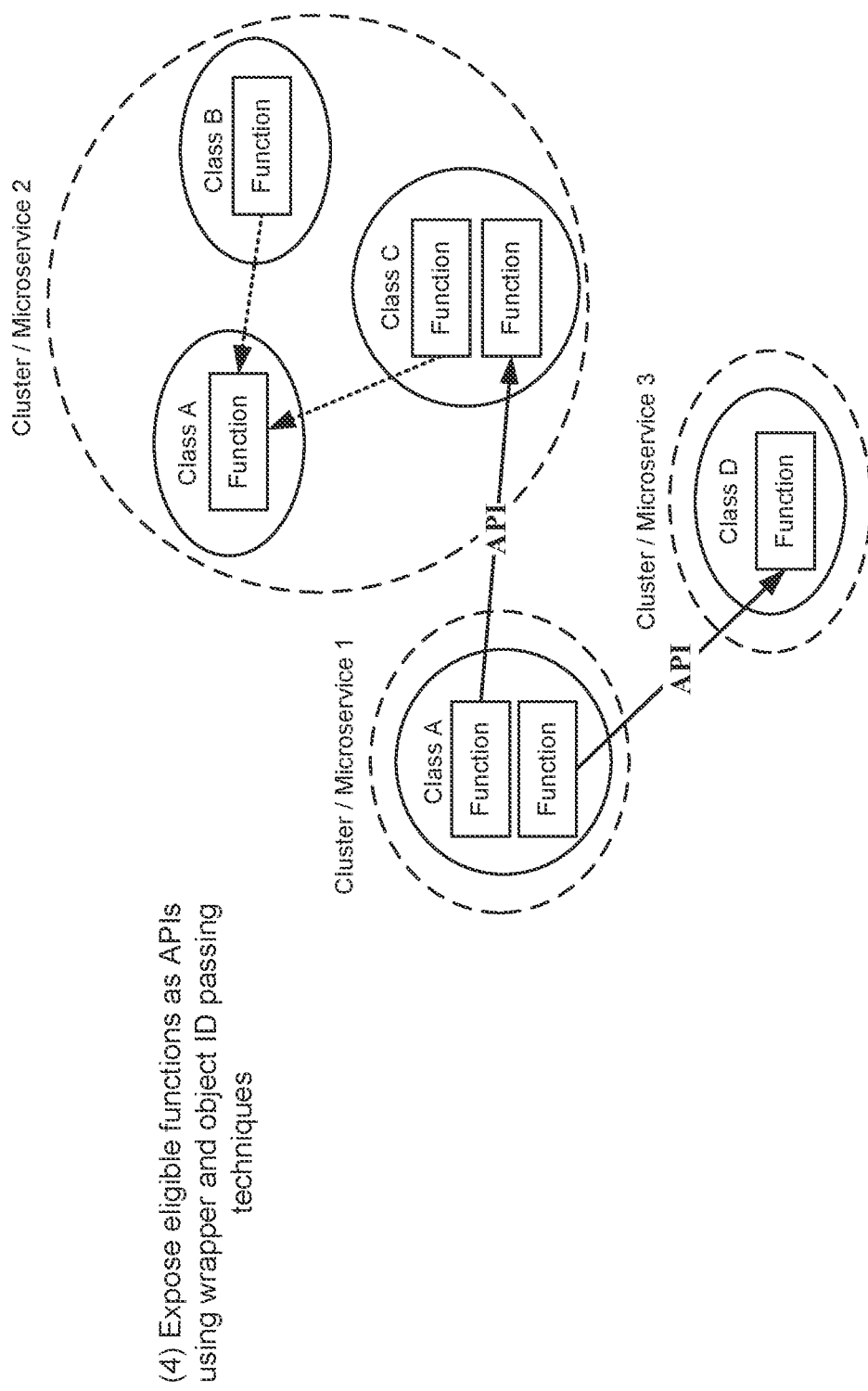

FIGS. 2A-B are diagrams illustrating an example method for automated monolith application refactoring that generates APIs for software functions used by multiple microservices, in accordance with some embodiments of the present disclosure. As shown in FIG. 2A, the method analyzes application code and libraries 202 for a monolith application and creates functionally aligned clusters of software classes. After creating the clusters of software classes, the method determines cross-cluster dependencies (shown as dotted lines) and moves eligible software functions to dependent clusters. In some embodiments, a call graph can be used to capture functional dependence within and across the software classes.

For cross-cluster dependencies that are not resolved by moving software functions to dependent clusters, the method can expose these software functions to other microservices using an API, as shown in FIG. 2B. Two microservices can act as a client and a server, respectively, when one microservice calls an API exposed from another microservice. Because the steps to expose a software function as an API and the steps to convert a call into an API call can make the resulting source code hard to maintain, software wrappers can be created on the client and server sides to encapsulate communication logic code used by the monolith application.

Figure 3:
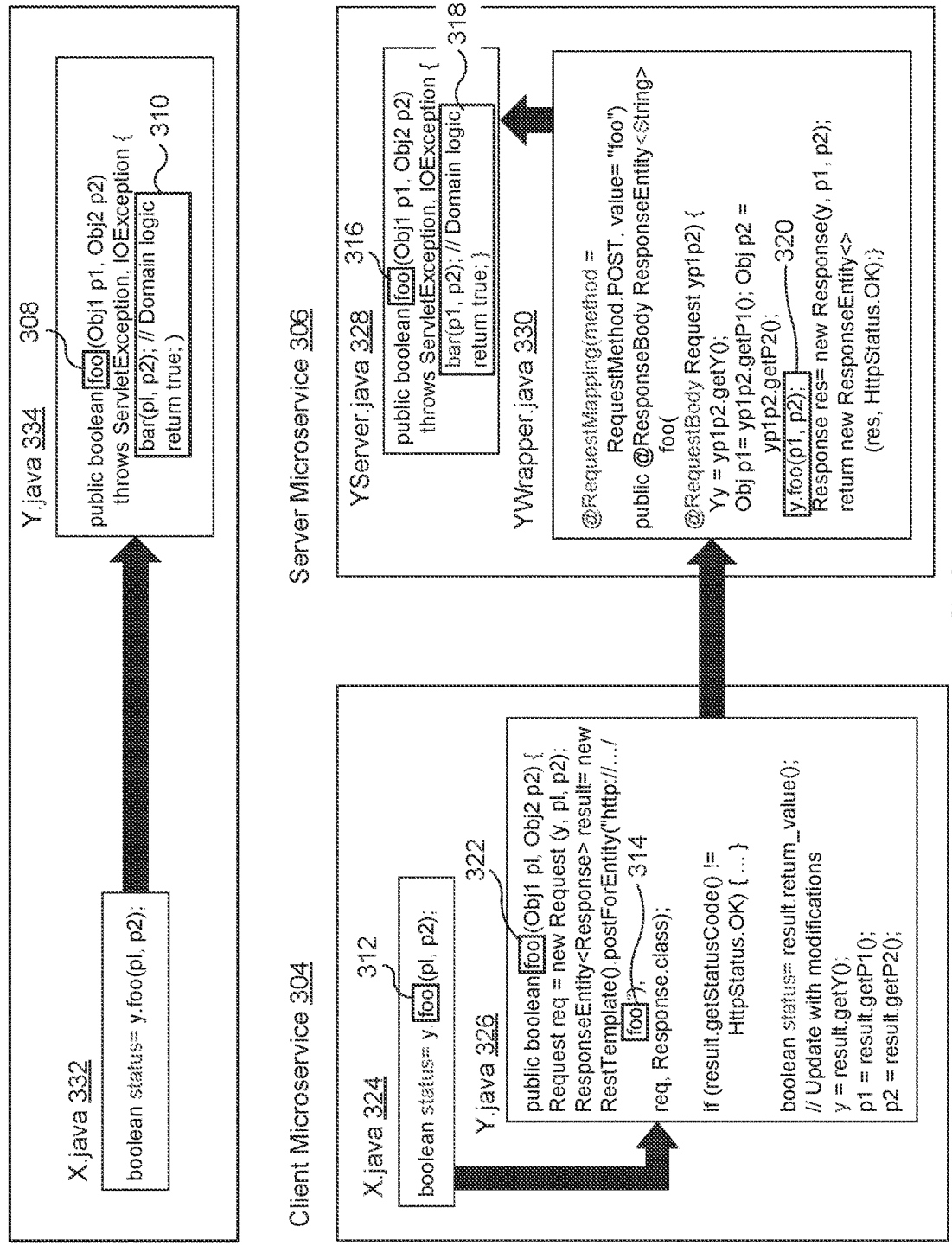
FIG. 3 is a diagram that illustrates an example of refactoring a monolith application to client-server microservices, in accordance with some embodiments of the present disclosure.

FIG. 3 illustrates an example of refactoring a monolith application 302 to client-server microservices 304/306, in accordance with some embodiments of the present disclosure. The monolith application 302 contains class X 332 and class Y 334, and the software function foo( ) 308 is defined in class Y 334 and called by class X 332. The client-server microservices 304/306 implement a wrapper technique, wherein wrapper classes Y 326 is created on the client microservice and YWrapper 330 is created on the server microservice 306.

As shown, client class X 324 on the client microservice 304 and server class Y 328 on the server microservice 306 are unmodified versions of class X 332 and class Y 334 in the monolith application 302. The unmodified version of class Y 334 is copied to the server microservice 306 and renamed so that if the server microservice 306 acts as a client and the YWrapper 330 is added, the name of server class Y 328 will not clash with the original class Y 334. For example, as shown in FIG. 3, "Y.java" 334 is renamed to "YServer.java" 328 on the server microservice 306.

Also, as shown, the wrapper class Y 326 is added to the client microservice 304, and the wrapper class YWrapper 330 is added to the server microservice 306. Note that the class and function signature in client class X 324 on the client microservice 304 has been retained so that the domain logic 318 in server class Y 328 can be an unmodified version of the original domain logic 310 defined in class Y 334 of the monolith application 302. Because the original domain logic 310 is not modified, coding standards like statelessness and concurrency can be carried forward to the microservices.

The operations that expose the software function foo( ) using an API can be placed in the wrapper class YWrapper 330 on the server microservice 306. The operations that make an API call to the software function foo( ) can be put in the wrapper class Y 326 on the client microservice 304. Consequently, the software function foo( ) 312 in class X of the client microservice 304 now calls foo( ) 322 in the wrapper class Y 326 on the client microservice 304. Wrapper class Y 326 makes a REST API call to the server microservice 306. The API exposes the call to foo( ) 320 in the wrapper class YWrapper 330 on the server microservice 306, which calls foo( ) 316 in server class Y 328 on the server microservice 306, which executes the unmodified domain logic 318 obtained from the monolith application 302.

Advantages of creating software wrappers on the client microservice 304 and the server microservice 306 include maintaining readability of the domain logic 310 obtained from the monolith application 302, which remains unmodified outside the wrapper functions, such that refactoring of the monolith application 302 is less intrusive. The advantages also include small code size because code duplication can be reduced as calls to the same API correspond to the same software wrapper. The advantages also include a low local memory footprint because separate variables for each API call may not be needed. The advantages also include low maintenance cost because modifications to the API call in the refactored code is localized to the software wrapper. The advantages also include simplified refactoring because without software wrappers, a software function call would be replaced with multiple API call statements, which can cause syntax errors if the function call was part of another expression.

Furthermore, the software wrapper technique described above handles overridden APIs automatically. When an overridden software function is called by a superclass reference, the subclass or superclass function to be executed is determined at runtime. For example, extending the monolith application 302 example shown in FIG. 3., consider a class Z (not shown) that overrides (extends) class Y 334, wherein class Z has its own definition of the software function foo( ). The software function call y.foo( ) in class X 332 would call the function foo( ) in class Y 334 or class Z depending on whether the call y.foo( ) holds the object of class Y 334 or class Z. Without the software wrapper technique, it cannot be determined at compile time whether the call y.foo( ) should be replaced with http:// . . . /y/foo or http:// . . . /z/foo. However, with the software wrapper technique, the software wrapper class X 324 and class Z (not shown) on the client microservice 304 can handle the run time decision of which of class X 324 or class Z will execute foo( ).

Figure 4:
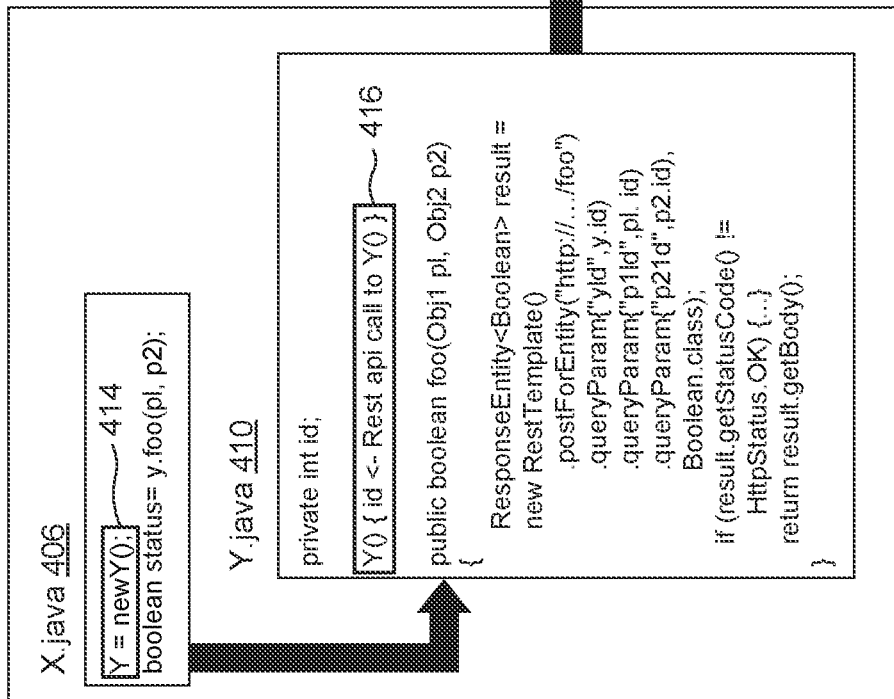
FIG. 4 is a diagram illustrating an example of using a unique object identifier in API communication between client-server microservices, in accordance with some embodiments of the present disclosure.

FIG. 4 illustrates an example of using a unique object identifier in communication between client-server microservices 402/404. A monolith application generally uses a shared memory address space and computing resources to handle object operations associated with executing a software function. However, the memory address space and computing resources become separated when converting the monolith application to a microservices-based architecture. Consequently, object references cannot be shared, necessitating a technique for sharing non-primitive objects. The technique should allow a client microservice 402 to pass an object reference and arguments, and allow a server microservice 404 to return variable values and reflect any state changes made in the arguments.

The present disclosure addresses the challenges associated with passing objects between microservices by creating a unique object identifier for each object and enabling API communications between the caller client microservice 402 and the provider server microservice 404 using the unique object identifier. In some examples, the server microservice 404 creates and saves an object in response to a request received from the client microservice 402. Each object created by the server microservice 404 is owned by the client microservice 402 that requested creation of the object. The server microservice 404 creates a unique object identifier and returns the unique object identifier to the client microservice 402. The server microservice 404 maintains a map of unique object identifiers to objects stored on the server microservice 404. On the client side, whenever an object needs to be created or accessed, the client microservice 402 sends a request to the server microservice 404 to create or access the object. On creation, the client microservice 402 receives a unique object identifier from the server microservice 404 and saves the unique object identifier in computer memory. The client microservice 402 passes the unique object identifier as a parameter in API calls to the server microservice 404 to access the object. To enable this technique, field accesses are performed via server APIs rather than via direct statements.

The example illustrated in FIG. 4 is based on the example monolith application shown in FIG. 3. As shown in FIG. 4, a client microservice 402 and server microservice 404 can be created to contain class X 406 and class Y 408, respectively. The client microservice 402 contains a wrapper class Y 410. Notice that the wrapper class Y 410 does not contain an object identifier field and does not save any object related fields. Wherever an object is instantiated 414 in the client microservice 402, the wrapper class Y 410 calls an object constructor 416. The object constructor 416 makes a REST API call to the server microservice 404, which creates an object and returns a unique object identifier for the object, as shown in the code snippet in wrapper class YWrapper 412.

FIG. 5 is a flow diagram illustrating an example method 500 for generating APIs for software functions used by multiple microservices, in accordance with some embodiments of the present disclosure. The method 500 can be implemented by, for example, an automated application refactoring system (e.g., automated application refactoring system 116 shown in FIG. 1), a server, a computer, a processor, and/or another configuration of hardware and/or software.

Operation 502 includes obtaining software classes of a plurality of microservices, where each of the microservices can comprise one or more of the software classes. The microservices are the product of refactoring a monolith application architecture into a microservice architecture. Refactoring of the monolith application can include creating one or more disconnected subgraphs of functional code configured to execute software functions and moving the disconnected subgraphs to clusters of software classes that depends on the software function. After refactoring, the microservices can provide the functionality of the monolith application as a service executed in a cloud environment.

Operation 504 includes analyzing the software classes of the plurality of microservices to identify a software function that is eligible for conversion to an API format.

In some embodiments, determining that a software function is eligible for an API includes identifying two or more microservices that have a software class that depends on the software function and determining that a cross-microservice dependency on the software function by the two or more microservices cannot be resolved by moving a disconnected portion of the software class defining the software function to a single microservice.

Operation 506 includes determining a server microservice, which hosts a software class that includes the software function, and one or more client microservices that use (call) the software function. In some embodiments, a disconnected subgraph that defines the software function can be moved to a server microservice selected to host the software function.

Operation 508 includes generating deployable source code to implement an API that exposes the software function to the one or more client microservices that use (call) the software function. The API exposing the software function uses a software wrapper to encapsulate the software function semantics used by a monolith application prior to refactoring the monolith application into the plurality of microservices.

In some embodiments, generating the deployable source code that implements the API includes generating deployable API packages that can be installed on the microservices. For example, the method 500 can generate a server API package to deploy to the server microservice and a client API package to deploy to the client microservice.

The server API package contains server-side API components that enable the server microservice to receive calls to execute the software function included in the software class of the server microservice. The server API package also contains a server wrapper class that exposes the software function to the one or more client microservices and encapsulates legacy source code used by the monolith application to execute the software function.

The client API package contains client-side API components that enable the client microservice to call the software function included in the software class of the server microservice. The client API package also includes a client wrapper class that includes instructions for calling the software function using the API and includes legacy source code used by the monolith application to call the software function.

In some embodiments, the client-server wrapper classes replace an object passing technique (used by the monolith application) with an object identifier passing technique. More specifically, the server wrapper class creates an object and a unique object identifier in response to a request from the client microservice. The object is managed by the server microservice using the computing resources of the server microservice. The server microservice provides the unique object identifier to the client microservice, and the client microservice includes the unique object identifier with requests to access the object managed on the resources of the server microservice.

Figure 6:
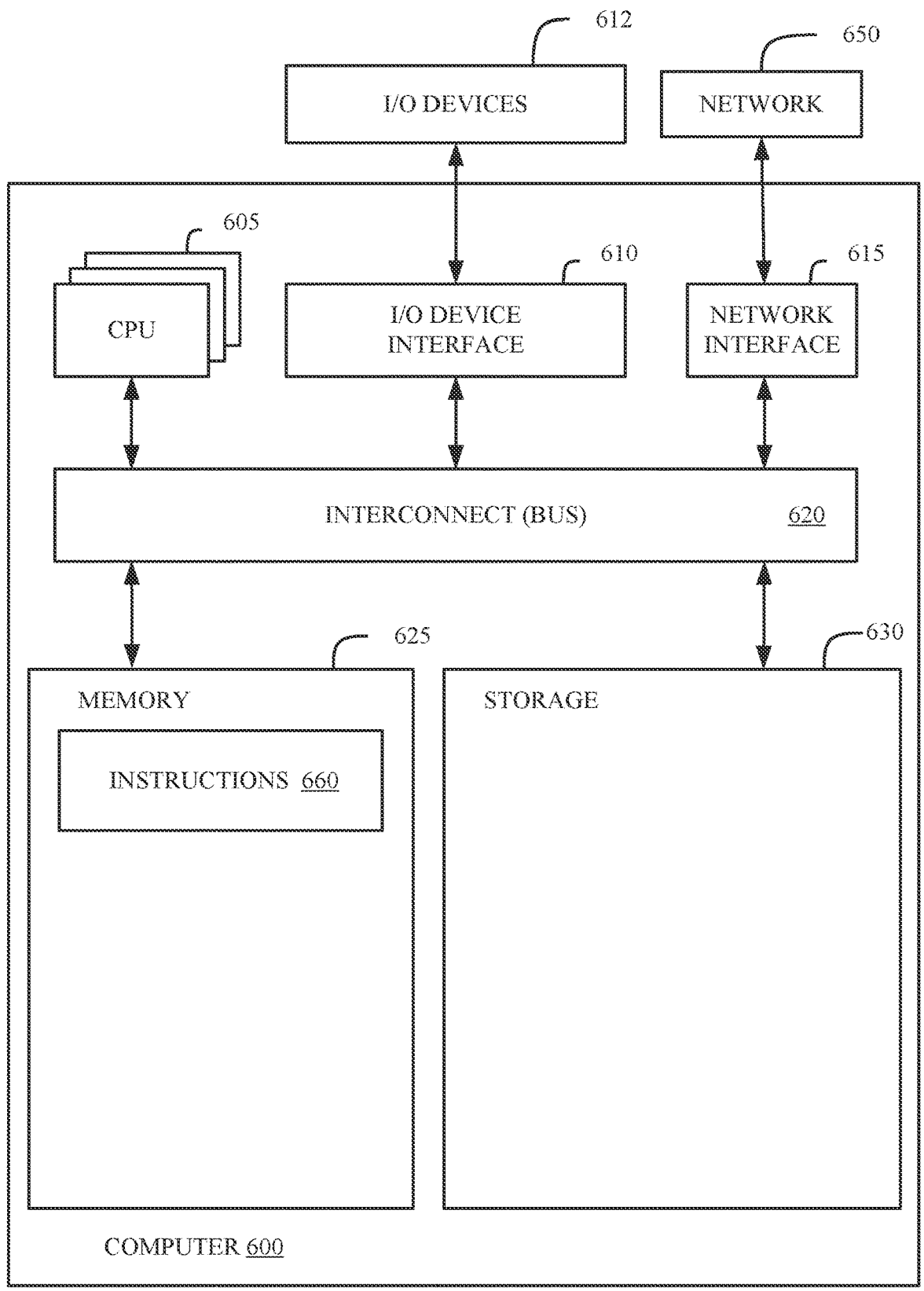
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all portions of the methods described in the figures of the present disclosure and/or implement the functionality discussed in association with the figures of the present disclosure. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine (e.g., automated application refactoring system 116 shown in FIG. 1) such that the client machine executes the method, or a portion of the method, based on the instructions provided by computer 600. In some embodiments, the computer 600 is incorporated into (or functionality similar to computer 600) is virtually provisioned to one or more entities illustrated in FIG. 1 and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods and/or implement the functionality discussed earlier. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
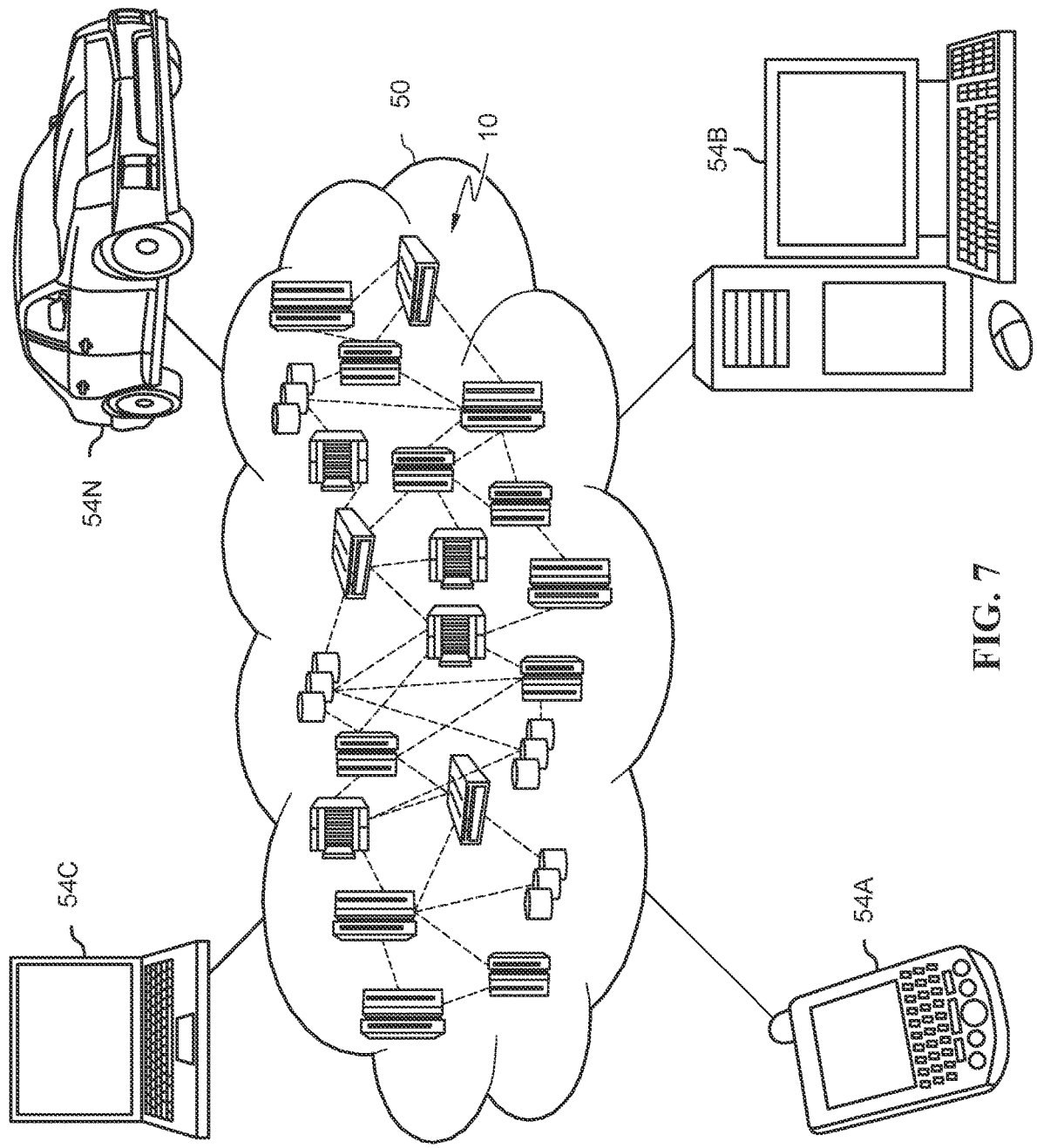
FIG. 7 depicts a cloud computing environment, in accordance with some embodiments of the present disclosure.

Referring now to FIG. 7, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
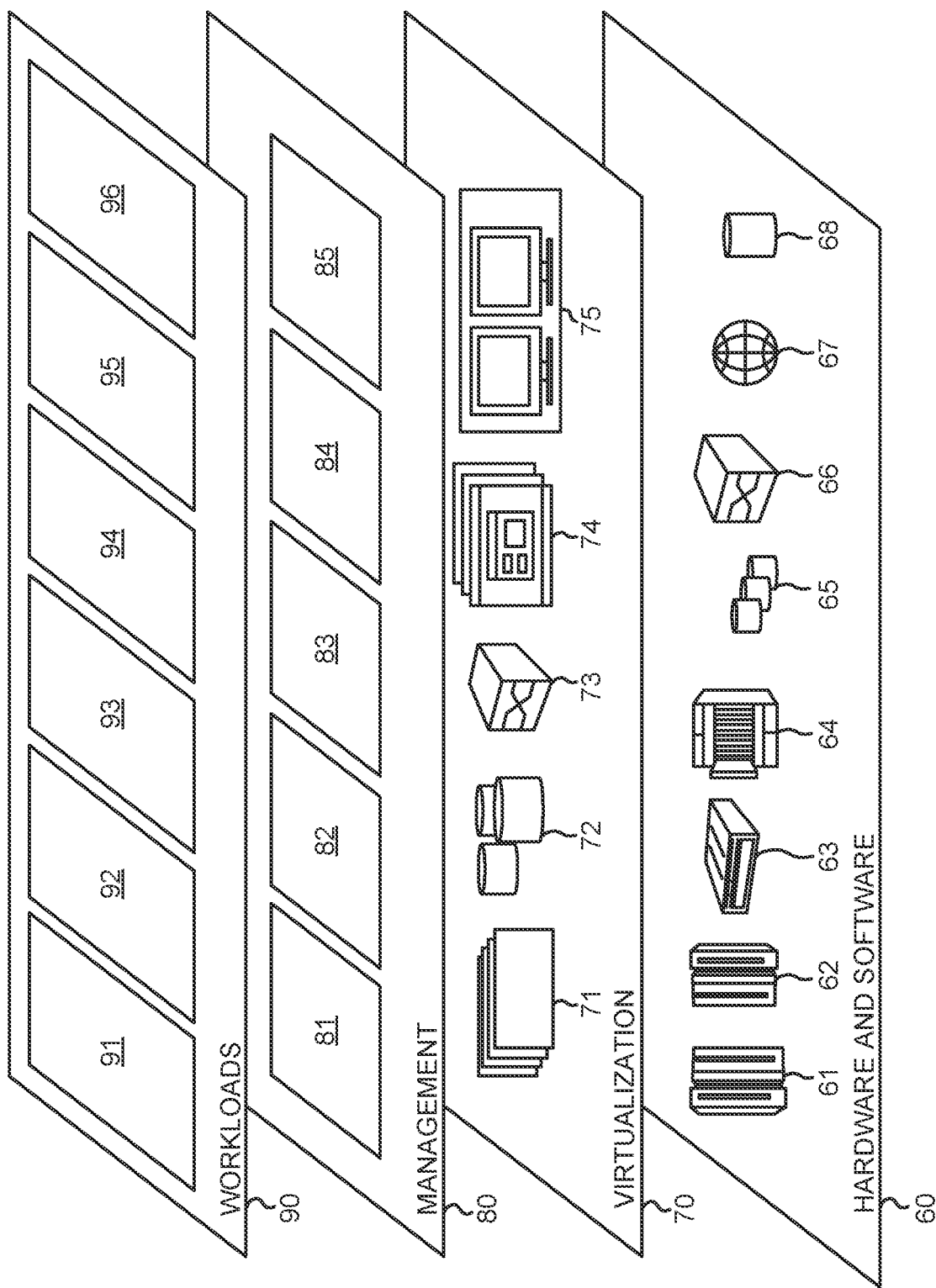
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which can be provided from this layer include: mapping and navigation 91; software development and lifecycle management 92; virtual classroom education delivery 93; data analytics processing 94; transaction processing 95; and automated generation of APIs that expose software functions hosted by microservices 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods and/or implement the functionality described with respect to the figures can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method, comprising:
   obtaining software classes of a plurality of microservices, wherein each microservice comprises one or more software classes;
   analyzing the software classes of the plurality of microservices to identify a cross-microservice dependency on a software function that cannot be resolved by moving the software function to a single microservice, which makes the software function eligible for conversion to an application programming interface (API) format that exposes the software function to client microservices that depend on the software function;
   determining, a server microservice to host a software class that includes the software function, and one or more client microservices that depend on the software function; and
   generating deployable source code implementing an API that exposes the software function hosted by the server microservice to the client microservices that depend on the software function, wherein the API uses a software wrapper to encapsulate software function semantics used by a monolith application which has been refactored into the plurality of microservices.

2. The method of claim 1, wherein generating the deployable source code that implements the API further comprises:
   generating a server API package to deploy to the server microservice containing server-side API components that enable the server microservice to receive calls to execute the software function included in the software class of the server microservice; and
   generating a client API package to deploy to the client microservice containing client-side API components that enable the client microservice to call the software function included in the software class of the server microservice.

3. The method of claim 2, wherein generating the server API package and the client API package further comprises:
   creating a server wrapper class to include instructions that expose the software function to the one or more client microservices, and to encapsulate legacy source code used by the monolith application to execute the software function; and
   creating a client wrapper class to include instructions for calling the software function using the API, and to include legacy source code used by the monolith application to call the software function.

4. The method of claim 3, wherein the server wrapper class and the client wrapper class replace an object passing technique used by the monolith application with an object identifier passing technique, comprising:
   creating, by the server microservice, an object and a unique object identifier in response to a request from the client microservice, and managing the object using resources of the server microservice, and
   providing, by the client microservice, the unique object identifier to the server microservice with requests to access the object managed on the resources of the server microservice.

5. The method in claim 1, wherein the software function semantics encapsulated in the software wrapper include semantics for overriding the software function.

6. The method in claim 1, wherein the API for the software function is selected from a group of API protocols consisting of: an open API protocol, a representational state transfer (REST) API protocol, a simple object access protocol (SOAP), and a remote procedure call (RPC) protocol.

7. A system, comprising:
   one or more computer readable storage media storing program instructions; and
   one or more processors which, in response to executing the program instructions, are configured to:
   refactor a monolith application into a plurality of microservices that comprise one or more software classes;
   analyze the software classes of the plurality of microservices to identify a cross-microservice dependency on a software function that cannot be resolved by moving the software function to a single microservice, which makes the software function eligible for conversion to an application programming interface (API) format that exposes the software function to client microservices that depend on the software function;
determine a server microservice, which hosts a software class that includes the software function, and one or more client microservices that depend on the software function; and
generate deployable source code implementing an API that exposes the software function hosted by the server microservice to the client microservices that depend on the software function, wherein the API uses a software wrapper to encapsulate software function semantics used by the monolith application refactored into the plurality of microservices.

8. The system of claim 7, wherein the program instructions that, when executed by the one or more processors, generate the deployable source code that implements the API further configure the one or more processors to:
generate a server API package to deploy to the server microservice containing server-side API components that enable the server microservice to receive calls to execute the software function included in the software class of the server microservice; and
generate a client API package to deploy to the client microservice containing client-side API components that enable the client microservice to call the software function included in the software class of the server microservice.

9. The system of claim 8, wherein the program instructions that, when executed by the one or more processors generate the server API package and the client API package further configure the one or more processors to:
create a server wrapper class to include instructions that expose the software function to the one or more client microservices, and to encapsulate legacy source code used by the monolith application to execute the software function; and
create a client wrapper class to include instructions for calling the software function using the API, and to include legacy source code used by the monolith application to call the software function.

10. The system of claim 9, wherein the server wrapper class and the client wrapper class replace an object passing technique used by the monolith application with an object identifier passing technique, comprising:
creating, by the server microservice, an object and a unique object identifier in response to a request from the client microservice, and managing the object using resources of the server microservice, and
providing, by the client microservice, the unique object identifier to the server microservice with requests to access the object managed on the resources of the server microservice.

11. The system of claim 7, wherein the software function semantics encapsulated in the software wrapper include semantics for overriding the software function.

12. The system of claim 7, wherein the API for the software function is selected from a group of API protocols consisting of: an open API protocol, a representational state transfer (REST) API protocol, a simple object access protocol (SOAP), and a remote procedure call (RPC) protocol.

13. A computer program product comprising one or more computer readable storage media, and program instructions collectively stored on the one or more computer readable storage media, the program instructions comprising instructions configured to cause one or more processors to:
refactor a monolith application into a plurality of microservices that comprise one or more software classes;
analyze software classes of the plurality of microservices to identify a cross-microservice dependency on a software function by two or more of the plurality of microservices, where the cross-microservice dependency cannot be resolved by moving the software function to a single microservice;
determine a server microservice, which hosts a software class that includes the software function, and one or more client microservices that use the software function; and
generate deployable source code implementing an application programming interface API that exposes the software function hosted by the server microservice to the client microservices that depend on the software function, wherein the API uses a software wrapper to encapsulate software function semantics used by the monolith application refactored into the plurality of microservices.

14. The computer program product of claim 13, wherein the instructions configured to cause the one or more processors to generate the deployable source code that implements the API further:
generate a server API package to deploy to the server microservice containing server-side API components that enable the server microservice to receive calls to execute the software function included in the software class of the server microservice; and
generate a client API package to deploy to the client microservice containing client-side API components that enable the client microservice to call the software function included in the software class of the server microservice.

15. The computer program product of claim 14, wherein the instructions configured to cause the one or more processors to generate the server API package and the client API package further:
create a server wrapper class to include instructions that expose the software function to the one or more client microservices, and to encapsulate legacy source code used by the monolith application to execute the software function; and
create a client wrapper class to include instructions for calling the software function using the API, and to include legacy source code used by the monolith application to call the software function.

16. The computer program product of claim 15, wherein the server wrapper class and the client wrapper class replace an object passing technique used by the monolith application with an object identifier passing technique, comprising:
creating, by the server microservice, an object and a unique object identifier in response to a request from the client microservice, and managing the object using resources of the server microservice, and
providing, by the client microservice, the unique object identifier to the server microservice with requests to access the object managed on the resources of the server microservice.

17. The computer program product of claim 13, wherein the instructions configured to cause the one or more processors to analyze the software classes of the plurality of microservices further:

receive mapping information via a user interface identifying the software function that is used by two or more of the plurality of microservices, wherein the user interface enables a user to specify a software function in source code of a monolith application and map the software function to one or more software classes in the source code of the monolith application that depend on the software function.

\* \* \* \* \*